July 5, 1932. L. STROBER 1,866,067
LOCK NUT
Filed June 17, 1930
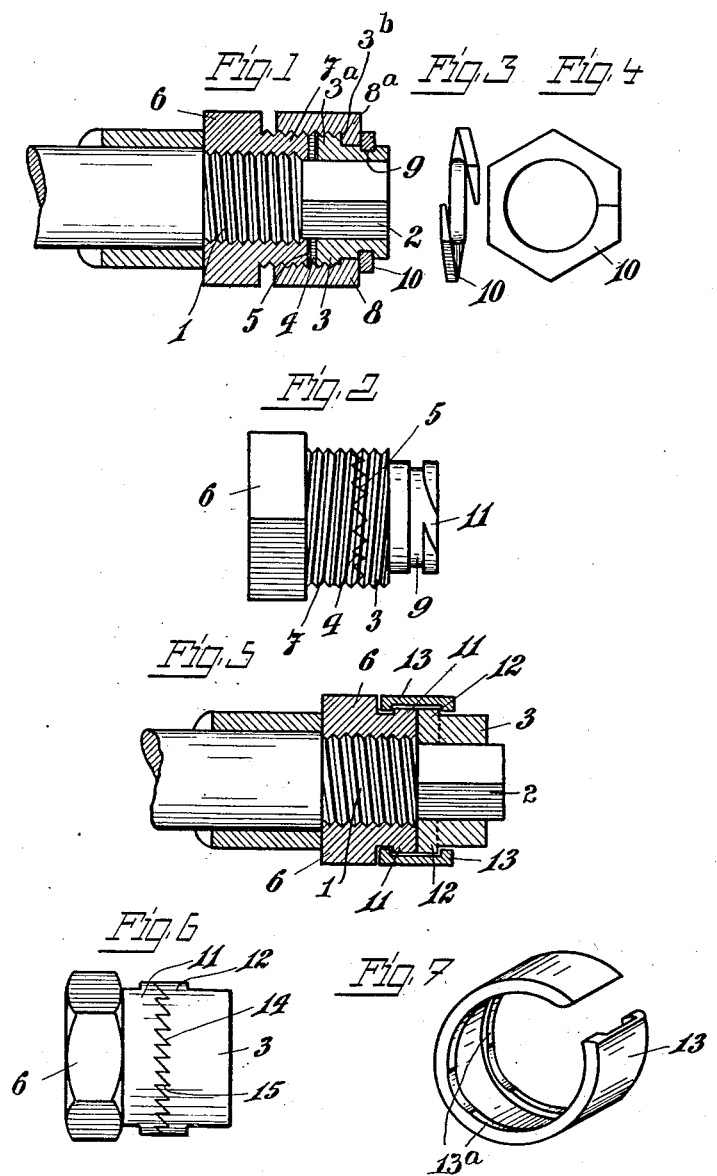
Ludwig Strober
INVENTOR Patented July 5, 1932

1,866,067

UNITED STATES PATENT OFFICE

LUDWIG STROBER, OF MUNICH, GERMANY

LOCK NUT

Application filed June 17, 1930, Serial No. 461,683, and in Germany July 4, 1929.

My invention relates to an improved nut lock and its principal object is to provide a simple and efficient construction capable of being economically produced.

Many forms of nut locks are known to the art and some of these forms are in actual use. A common form is one in which the usual nut is complemented by a locking nut, both nuts having serrated surfaces intended to engage with each other or in some cases the bolt is provided with a reduced threaded extension upon which the locking nut, threaded oppositely to the main nut is received. Another form is one in which a cap or sleeve embraces the main nut and the locking nut for the purpose of holding the same in locking position.

The principal disadvantage of these prior art constructions is that the locking member is designed to be held in place by threads and as threads are liable to strip or break down under load, the measure of security thus afforded is but slight. In an attempt to overcome this disadvantage, a construction has been suggested in which a lock nut or sleeve is mounted on an extension of the bolt so as to be axially movable but held against rotation, the sleeve having an opening corresponding in shape to and designed to receive the nut and a wedge being employed to prevent longitudinal movement of the parts. The defect of this construction is that, usually, the nut cannot be completely tightened because its position must always correspond to that of the locking nut or sleeve and, obviously, if the nut cannot be fully tightened the application of securing means will not produce the required measure of safety.

By means of my invention the defects of prior art constructions are obviated and, in accordance with my invention, I provide the nut and the locking nut, which is axially movable but not rotatable on an extension of the bolt, with interengageable serrations and I secure both nuts together by a common connecting member which embrace the two nuts. In the preferred form of the invention the two nuts are exteriorly threaded and the connecting member is interiorly threaded for engagement with the exterior threads of the nuts. As an additional precautionary measure the connecting member may be held in place by a split ring.

Two forms of the invention are illustrated in the accompanying drawing in which Fig. 1 is an assembled longitudinal sectional view of the preferred form; Fig. 2 is a side elevation thereof; Fig. 3 is a perspective view of a split ring used with the preferred form of the device; Fig. 4 is an elevational view of said ring; Fig. 5 is an assembled longitudinal sectional view of a modified form of the invention; Fig. 6 is a side elevation thereof and Fig. 7 is a perspective view of the connecting members used with the form of Figs. 5 and 6.

In the form of invention shown in Figs. 1 to 4 of the drawing, 1 designates the bolt having an intermediate threaded portion and an angular extension 2 designed to receive a locking nut 3 having an orifice shaped to correspond to the contour of the extension 2. The forward face of the locking nut is serrated at 4 for engagement with similar serrations 5 on the forward face of the nut 6 threaded onto the bolt 1. The nut 6 has an exteriorly threaded, reduced, extension 7 and the enlarged part 3ª is also exteriorly threaded, both threads being preferably left handed.

For the purpose of maintaining the nuts 3 and 6 in proper relative positions with their serrations 4 and 5 interlocked, I provide a connecting or clamping member 8 which is interiorly left handedly threaded to engage their exterior threads on the nuts 3 and 6.

Adjacent its outer end, the nut 3 is provided with an annular groove 9 for the reception of a split ring 10 which serves to secure the clamping member 8 in position. To facilitate insertion of the ring 10 in the groove 9 I provide adjacent the latter on the outer end of the nut 3 a helical path 11 which guides the ring into position when the ring is turned. The ring is preferably hexagonal.

The parts above described are assembled as follows:—The nut 6 is tightly screwed onto the bolt 1, the locking nut 3 is placed on the bolt extension 2 and, if necessary, the nut 6 is rotated to cause firm interengagement of the serrations 4 and 5. Thereupon, the clamping member 8 is screwed towards the left on to the exterior threads of the nut 3 and nut 6 until the flange 8ª strikes and firmly engages the shoulder 3ᵇ whereby the nuts 3 and 6 are tightly pressed together. Then the split ring 10 is placed in position in the groove 9 through the helical path 11 and all parts are interlocked. The clamping member 8 cannot become loose because it is secured by the ring 10 and the nut 6 is held against movement by the nut 3, while the latter cannot rotate owing to the shape of the orifice therein and the extension 2 and also because of the interlock with the nut 6 and the grip of the clamping member.

In the modified form shown in Figs. 5 and 6, the nuts 6 and 3 are provided with enlarged ends or heads 11 and 12, respectively, having the teeth or serrations 14 adapted to interlock. The nuts 6 and 3 are clamped together by an elastic split ring or sleeve 13 having inturned flanges 13ª designed to engage behind the outer edges of the heads 11 and 12.

To avoid placing the ring 13 under load in case the nut 6 is turned in release direction, the serrations 14 on the nuts 6 and 3 are such that in this case parallel surfaces 15 of the serrations 14 press against one another. To accomplish this, the serrations 14 are steeply pitched on one side and less so on the other.

The construction of the modified form is just as efficient as that of the preferred form but may be produced at less cost.

I claim:

1. A lock nut construction, comprising a bolt, a shouldered nut thereon, a shouldered lock nut on said bolt adapted to interlock with the first mentioned nut, and a flexible connecting member having flanges for engaging the shoulders of said nuts and holding the latter tightly in engagement with each other.

2. A lock nut construction, comprising a bolt, a shouldered nut thereon having its forward face serrated, and having a peripheral shoulder, a lock nut having a peripheral shoulder and having its forward face serrated for interlocking engagement with the serrated forward face of the first mentioned nut, and a flexible split clamping member having lateral flanges for engaging the shoulders of said nuts and holding the serrated faces thereof in firm interengagement.

In testimony whereof I affix my signature.

LUDWIG STROBER.